(12) United States Patent
Urairi et al.

(10) Patent No.: US 6,811,927 B1
(45) Date of Patent: Nov. 2, 2004

(54) BATTERY CONTAINING A POLYCARBODIIMIDE POLYMER

(75) Inventors: Masakatsu Urairi, Osaka (JP); Keisuke Kii, Osaka (JP); Yutaka Kishii, Osaka (JP); Yutaka Yamamura, Osaka (JP); Masao Abe, Osaka (JP); Sadahito Misumi, Osaka (JP); Fumiteru Asai, Osaka (JP)

(73) Assignee: Nitto Denko Corporation, Osaka (JP)

( * ) Notice: Subject to any disclaimer, the term of this patent is extended or adjusted under 35 U.S.C. 154(b) by 3 days.

(21) Appl. No.: 09/979,716

(22) PCT Filed: Apr. 4, 2001

(86) PCT No.: PCT/JP01/02917

§ 371 (c)(1),
(2), (4) Date: Nov. 28, 2001

(87) PCT Pub. No.: WO01/75994

PCT Pub. Date: Oct. 11, 2001

(30) Foreign Application Priority Data

| Apr. 5, 2000 | (JP) | 2000-103445 |
| Apr. 5, 2000 | (JP) | 2000-103446 |
| Apr. 5, 2000 | (JP) | 2000-103447 |
| Apr. 5, 2000 | (JP) | 2000-103448 |
| Apr. 5, 2000 | (JP) | 2000-103449 |
| Apr. 5, 2000 | (JP) | 2000-103450 |
| Apr. 5, 2000 | (JP) | 2000-103451 |
| Apr. 5, 2000 | (JP) | 2000-103452 |
| Apr. 5, 2000 | (JP) | 2000-103453 |
| Oct. 26, 2000 | (JP) | 2000-327159 |
| Nov. 17, 2000 | (JP) | 2000-350559 |

(51) Int. Cl.$^7$ ............................................. H01M 2/16
(52) U.S. Cl. ........................... 429/314; 429/248; 429/249; 429/250
(58) Field of Search .................. 429/303, 306, 429/309, 315, 248–250, 314; 252/62.2

(56) References Cited

U.S. PATENT DOCUMENTS

| 4,190,707 | A | * | 2/1980 | Doi et al. .................... 429/254 |
| 4,832,869 | A | * | 5/1989 | Cotts .......................... 252/500 |
| 5,093,214 | A |   | 3/1992 | Saito et al. ................... 429/44 |
| 6,077,628 | A | * | 6/2000 | Takechi et al. ............. 429/325 |

FOREIGN PATENT DOCUMENTS

| JP | 2-98004 | 4/1990 | ............ H01B/1/12 |
| JP | 4-167355 | 6/1992 | ............ H01M/2/16 |
| JP | 6-16907 | 1/1994 | ............ C08L/63/00 |
| JP | 10-294129 | 11/1998 | ............ H01M/10/40 |
| JP | 11-238496 | 8/1999 | ............ H01M/2/16 |

OTHER PUBLICATIONS

McElhill et al. "New Organic Depolarizers", Proc. Ann. Power Sources Conf. (1963), 17, pp. 145–148.*
Derwent Abstract for JP 02–098004 A (Apr.1990).*
JPO Machine Translation for JP 06–016907 A (Jan. 1994).*
JPO Machine Translation for JP 08–055620 A (Feb. 1996).*
Derwent abstract for DD 228398 A.*
International Search Report for PCT/JP01/02917 dated Jul. 3, 2001.
Wiff, et al. "Polycarbodiimide and polyimide/cyanate thermoset in situ molecules composites", Journal of Materials Research, Jul. 1998, vol. 13, No. 7, p. 1840–1847.

* cited by examiner

*Primary Examiner*—Susy Tsang-Foster
(74) *Attorney, Agent, or Firm*—Sughrue Mion, PLLC

(57) ABSTRACT

A battery highly inhibited from suffering self-discharge.

The battery is characterized by containing a built-in polymer which has in the molecule a carbodiimide unit represented the following formula (I):

$$-[-R-N=C=N-]_n-  \qquad (I)$$

wherein R means an organic group and n means an integer of 1 to 10,000).

13 Claims, 2 Drawing Sheets

BATTERY CONTAINING A POLYCARBODIIMIDE POLYMER

TECHNICAL FIELD

The present invention relates to a battery containing built-in polycarbodiimide. According to the invention, battery self-discharge is inhibited and the battery life is prolonged.

BACKGROUND ART

Secondary batteries such as nickel-hydrogen cells and nickel-cadmium (Ni—Cd) cells are recently expected to be used as power sources for electric cars as well as small batteries for electrical/electronic appliances. Such a secondary battery is generally constituted of a positive electrode, a negative electrode, and a separator. Among these, the separator serves to prevent the cell from short-circuiting between the electrodes and enable ions to pass therethrough, and is required to have hydrophilicity, chemical resistance, and mechanical strength. Conventionally known as a separator is a hydrophilic nonwoven fabric formed from a polyamide resin or the like. However, this separator has insufficient resistance to chemicals (alkalis and acids). Because of this, separators comprising polyolefin nonwoven fabrics which have undergone various treatments are also known. Specifically, separators obtained by subjecting a polyolefin-based nonwoven fabric to a hydrophilizing treatment, e.g., impregnation with a surfactant, plasma treatment, grafting treatment, sulfonation treatment, or the like, have been proposed (Unexamined Published Japanese Patent Applications Nos. 4-167355 and 11-238496, etc.).

Furthermore, since the polyamide-based nonwoven fabric has amide bonds, batteries employing this as a separator show a higher degree of self-discharge than batteries employing an electrochemically inert polyolefin nonwoven fabric and have poor battery properties. In contrast, batteries employing a separator obtained by subjecting a polyolefin-based nonwoven fabric to a specific treatment cannot be regarded as fully satisfactory in self-discharge characteristics, although superior in overall battery properties to batteries employing the polyamide-based separator.

Specifically, the separator obtained by treating a polyolefin-based nonwoven fabric with a surfactant shows effective hydrophilicity in the initial stage of use. However, when this separator is once immersed in water, taken out therefrom, dried, and reimmersed in water, then the hydrophilicity decreases considerably. In addition, this separator is unsatisfactory in self-discharge characteristics.

Furthermore, the polyolefin-based nonwoven fabric which has undergone a plasma treatment has hydrophilic groups bonded to the substrate surface by covalent bonding and hence retains sufficient wettability even when it is immersed in water, dried once, and reimmersed in water. Namely, it is wet-dry reversible. However, in the case where this nonwoven fabric is immersed in an aqueous alkali solution having a high concentration, it is not wetted by water when it is washed with water, dried, and reimmersed in water. It is presumed that the hydrophilic but weakly adherent, interfacial layer formed on the substrate surface by the plasma treatment was peeled off upon contact with the high-concentration aqueous alkali solution. This separator also is ineffective in greatly improving the inhibition of self-discharge.

In the case of the polyolefin-based nonwoven fabric which has under gone a grafting treatment, a water-soluble monomer is tenaciously bonded to a substrate by covalent bonding. However, the polyolefin treated by grafting with acrylic acid or methacrylic acid has the possibility of undergoing oxidative decomposition in a strongly oxidizing atmosphere because this polyolefins of the carboxylic acid type. Consequently, this nonwoven fabric is used as a battery separator in limited applications.

Furthermore, the polyolefin-based nonwoven fabric which has undergone a sulfonation treatment has sulfo groups tenaciously bonded to the substrate by covalent bonding. Consequently, this nonwoven fabric retains long-lasting hydrophilicity and functions to inhibit a battery from suffering self-discharge. However, the treatment necessitates a post-washing step.

An object of the invention is to provide a battery which is sufficiently inhibited from suffering self-discharge and has excellent battery properties. The present inventors made extensive investigations on the self-discharge of batteries. As a result, it has unexpectedly been found that the self-discharge of a battery is considerably inhibited by causing polycarbodiimide to be present in the battery. The invention has thus been completed.

DISCLOSURE OF THE INVENTION

The invention provides a battery containing a built-in polymer which has in the molecule a carbodiimide unit represented by the following formula (I):

$$-[-R-N=C=N-]_n-  \qquad (I)$$

(wherein R means an organic group and n means an integer of 1 to 10,000).

The battery of the invention can be inhibited from suffering self-discharge due to the built-in polycarbodiimide represented by general formula (I), which is disposed in any of various forms such as sheet, powder, and particles in or on an electrode or the separator or in other inner part of the battery.

The built-in polycarbodiimide may be disposed in any desired position within the battery. Furthermore, the battery is not particularly limited in steps for the production thereof. In the case where the polycarbodiimide is particulate or powdery, it may be placed in a bag made of a net or porous material having an opening diameter smaller than the particles, so as to prevent the polycarbodiimide from scattering. In the case where the polycarbodiimide is particulate or powdery, it may be present on the surface of or in an inner part of a porous separator substrate. It may have been deposited on the surface of the separator by coating. The polycarbodiimide maybe present on the surface of or in an inner part of an electrode. It may also be present between the separator and an electrode. Incidentally, the polycarbodiimide may be crosslinked if desired.

DETAILED DESCRIPTION OF THE INVENTION

Figure 1:
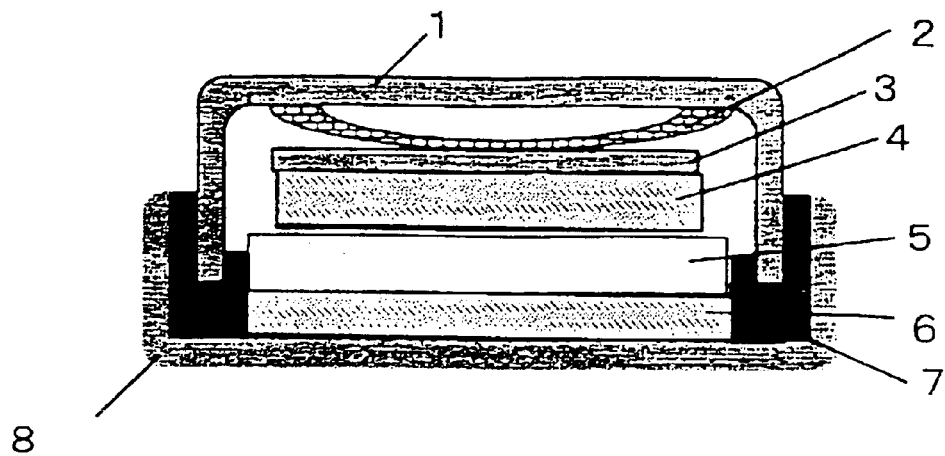
[FIG. 1] A schematic sectional view illustrating one embodiment of the battery of the invention.
Figure 2:
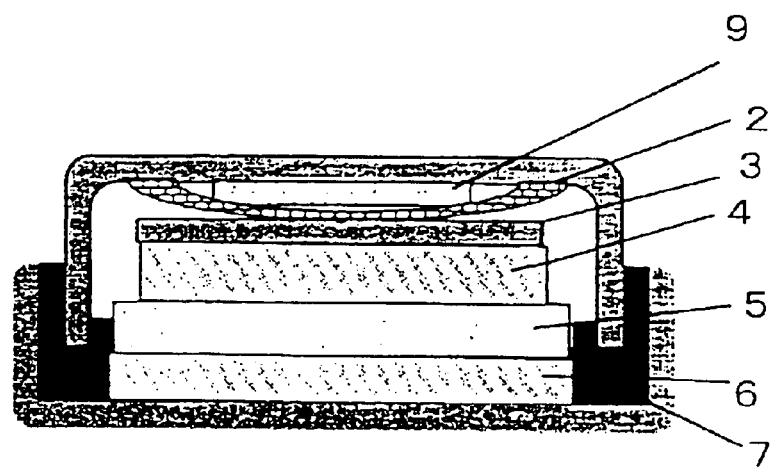
[FIG. 2] A schematic sectional view illustrating another embodiment of the battery of the invention.
Figure 3:
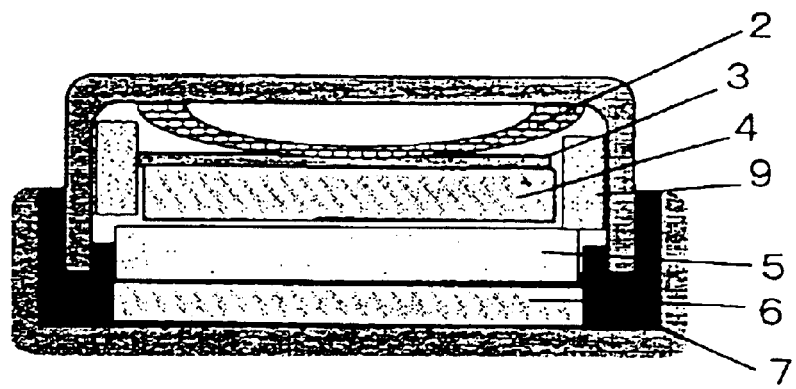
[FIG. 3] A schematic sectional view illustrating still another embodiment of the battery of the invention.
Figure 4:
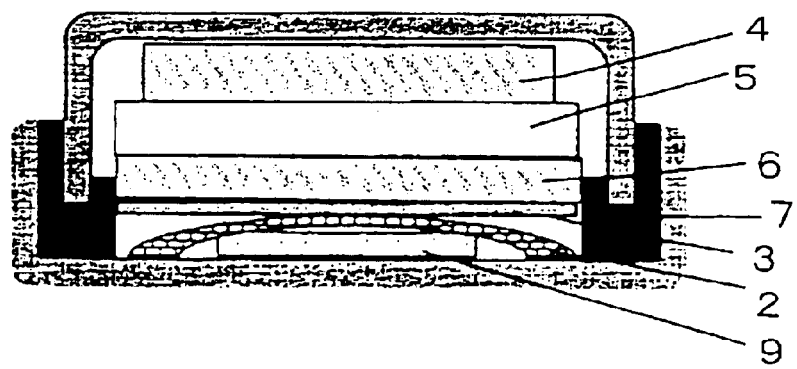
[FIG. 4] A schematic sectional view illustrating a further embodiment of the battery of the invention.

The battery of the invention is not limited at all as long as it has built-in polycarbodiimide. The battery has a positive electrode, a negative electrode, and a separator interposed between the two electrodes. The other materials constituting the battery, including the electrolytic solution and battery case, may be conventionally known ones. FIG. 1 is a schematic sectional view of a battery (button type cell) of the invention. As shown in FIG. 1, a nickel wire gauze 2 and a nickel collector 3 are disposed in a cell inner case 1. Furthermore, a negative electrode 4, a separator 5 having polycarbodiimide, and a positive electrode 6 are superposed thereon and an outer cover 8 is attached through a packing 7. FIGS. 2 to 4 are schematic sectional views illustrating other embodiments of the battery of the invention. In these embodiments, a polycarbodiimide film 9 is disposed in respective inner positions in the batteries. The battery according to the invention may be either a cylindrical cell containing electrodes and a separator which have been superposed and spirally wound or a prismatic cell comprising electrodes and a separator which have been superposed and packed in a case.

The separator or the porous sheet to be used as a separator substrate is not particularly limited in material. However, for use in applications where the separator is used in a strongly oxidizing or reducing atmosphere e.g., like the separators for alkaline secondary batteries, the material thereof is preferably a polyolefin or the like having no specific functional groups.

Examples of the polyolefin to be used as the separator (or separator substrate) include homopolymers or copolymers of olefins such as ethylene, propylene, 1-butene, 4-methyl-1-pentene, and 1-hexene, blends of these polymers, and the like. Preferred of these are polypropylene and polyethylene. Especially preferred for use in a strongly oxidizing or reducing atmosphere as, e.g., the separator of an alkaline secondary battery or the like is ultrahigh-molecular polyethylene (hereinafter abbreviated as UHPE) having a weight average molecular weight of 1,000,000 or higher.

With respect to the form of the porous sheet, it is preferably a porous film or a nonwoven fabric. The porous sheet is not particularly limited in pore diameter or porosity.

(Application to Separator)

In the case where polycarbodiimide is applied to a separator, particles or a powder of the polycarbodiimide is disposed in pores of a porous sheet substrate. In producing such a separator, a sheet substrate is immersed in a dispersion of particles or a powder of the polycarbodiimide, or the dispersion is applied to the substrate, whereby the polycarbodiimide is infiltrated into pores of the porous substrate. Due to the incorporation of the particles or powder in pores of the separator, the separator has a substantially increased surface area and a reduced pore diameter, whereby the function of inhibiting self-discharge and liquid retentivity are improved. The dispersion is more preferably one in which the dispersion medium is a polycarbodiimide solution. Upon drying, the solution forms a coating film on the surface of the fibers or particles constituting the separator, whereby not only the surface area of polycarbodiimide is increased but also the particles or powder is prevented from falling from the separator. The particles or powder of carbodiimide can be obtained by vacuum-drying a polycarbodiimide solution and optionally conducting pulverization.

Furthermore, use may be made of a separator obtained by coating at least part of the surface of a porous sheet substrate with polycarbodiimide. It is especially preferred to use as the sheet substrate a porous sheet obtained by sintering a powder of UHPE. The coating may be accomplished by immersing a sheet substrate in a polycarbodiimide solution and then evaporating the solvent by drying. If desired, the polycarbodiimide may be crosslinked.

In the case of using a porous sheet substrate consisting of a UHPE powder bonded to one another, this porous sheet usually preferably has a thickness of from 10 to 300 μm, a porosity of from 20 to 80%, and a pore diameter of from 1 to 500 μm. A UHPE porous sheet which can be used in the invention is obtained, for example, in the following manner. A UHPE powder is packed into a shape-retaining tool, and this shape-retaining tool is placed in a pressure vessel. The air present in the vessel is discharged. Subsequently, the powder is sintered in a water vapor atmosphere heated to a temperature not lower than the melting point of the UHPE and then cooled to thereby obtain a porous material in a block form. Thereafter, this porous material is sliced into sheets of a given thickness.

A polycarbodiimide-coated separator can be obtained by immersing a porous sheet substrate in a polycarbodiimide solution and then evaporating the solvent by drying. If desired, the polycarbodiimide may be crosslinked.

Furthermore, a porous sheet of polycarbodiimide which has been made porous by perforation, etching, or the like may be used as the separator. Examples of methods for producing this porous sheet include (i) a method in which a sheet is formed from a polycarbodiimide solution and this sheet is perforated with needles or a laser; and (ii) a method which comprises adding a particulate, powdery, or fibrous material to a polycarbodiimide solution, forming the mixture into a sheet, and then extracting the particulate, powdery, or fibrous material. It is also possible (iii) to obtain a porous sheet through chemical etching. Examples of methods for this chemical etching include the following method. A metal wire (copper wire, etc.) is coated with a polycarbodiimide solution, and this coated wire is tightly wound repeatedly on a core until the resultant structure comes to have a given diameter. Subsequently, the resulting structure is heated to a temperature not lower than the softening point (preferably not lower than the melting point) of the polycarbodiimide to thereby remove the solvent and simultaneously unite the loops of the coated metal wire. After cooling, this united tubular structure is sliced in a direction perpendicular to the metal wire to obtain a sheet having a given thickness. The metal wire is removed from this sheet with an etchant such as hydrochloric acid or sulfuric acid. In the case of using this chemical etching method, heating conditions usually include a temperature of from 140 to 200° C., a time period of from 0.5 to 5 hours, and an etchant concentration of from 0.1 to 10 mol/L. The porous separator thus obtained usually has a thickness of from 10 to 300 μm, a porosity of from 20 to 80%, and a pore diameter of from 1 to 500 um.

For the purpose of improving initial wettability by an electrolytic solution, the porous sheet may be coated with a surfactant beforehand.

As the separator may also be used a sheet having a given thickness obtained by slicing either a porous sinter obtained by sintering a polycarbodiimide powder at a temperature not lower than the melting point thereof or a porous sinter obtained by sintering polycarbodiimide and polyolefin particles at a temperature not lower than the melting point of the polyolefin particles. As this polyolefin may be used the aforementioned polyolefins. Especially preferred is UHPE. Such a porous film in which UHPE has been blended can be produced, for example, in the following manner.

Particles of a polymer having carbodiimide units in the molecule are mixed with UHPE according to need, and this mixture is packed into a shape-retaining tool. The powder mixture packed is sintered by heating in a hot-air drying oven at a temperature not lower than the melting point of the UHPE. Alternatively, the shape-retaining tool is placed in a pressure vessel and, after the discharge of the air present in the vessel, the powder mixture is sintered in a water vapor atmosphere heated to a temperature not lower than the melting point of the UHPE. The resultant sintered powder mixture is cooled to obtain a porous sinter. Thereafter, this porous sinter is sliced into a given thickness, whereby a porous sheet can be produced.

Furthermore, a porous sheet produced by aggregating coated polymer particles obtained by forming a coating layer of polycarbodiimide on the surface of core particles made of a polyolefin resin or the like may be used as the separator. This porous sheet can be produced, for example, by forming a coating layer of the polycarbodiimide on the surface of core particles and sintering the coated polymer particles at a temperature not lower than the melting point of the core particles.

Incidentally, if n in formula (I) exceeds 10,000, the polycarbodiimide is insoluble in solvents and the desired polycarbodiimide-coated polymer particles cannot be obtained. From the standpoint of obtaining evenly coated polymer particles, n is preferably from 5 to 100, more preferably from 10 to 50.

For forming the core particles to be used for the coated polymer particles, either a thermoplastic or a thermosetting resin is used. Preferred are polyolefin resins such as polypropylene and polyethylene and fluororesins because these resins have excellent resistance to alkaline electrolytic solutions. Especially preferred is UHPE.

A coated polymer is produced in the following manner. When the polycarbodiimide is solid, it is dissolved in a solvent. In the case of a solution, it may be diluted to a given concentration so as to be easily handled. To the polycarbodiimide solution thus prepared are added core polymer particles in such an amount as to result in a core particle concentration of about from 20 to 50% by weight. The resultant mixture is stirred with a mixer to obtain a slurry. This slurry is stirred with heating at a temperature lower than the melting point of the core particles to conduct a solvent elimination treatment. In the case where the resultant coated polymer particles are in an aggregated state, a treatment for reducing the aggregate is suitably conducted using a stirrer, pulverizer, etc.

The polycarbodiimide-coated polymer particles described above are packed, for example, into a cylindrical metal vessel, heated and sintered, subsequently cooled, and then taken out from the vessel to thereby obtain a porous sinter. Furthermore, this sinter is sliced into a given thickness with a lathe to obtain a porous sheet. Alternatively, a porous sheet is obtained also by a method in which the coated polymer particles are compressed at ordinary temperature in a mold having a certain gap to obtain a sheet-form molding and this sheet is heated and sintered.

(Application to Electrode)

In one embodiment of the battery of the invention, at least one of the positive electrode and negative electrode of the battery contains polycarbodiimide. This electrode is produced from an electrode-forming dispersion containing polycarbodiimide. The polycarbodiimide compound may be in a powder form or solution form. In this case, a conventional production apparatus can be used without modifying the production steps. In another embodiment, polycarbodiimide is disposed on the surface of at least one of the positive electrode/negative electrode. In this case, the electrode is produced by scattering particulate or powdery polycarbodiimide on the surface of an electrode and then uniting the polycarbodiimide with the electrode by pressing, etc.

(Application to Other Parts of Battery)

In other embodiments of the invention, particles or a powder of polycarbodiimide may be sprinkled on a part other than the separator and the electrodes, e.g., between the separator and an electrode. This can be accomplished by merely disposing the particles or powder between an electrode and the separator during battery fabrication, and a conventional apparatus can be used therefor without necessitating a considerable modification in the production steps. Furthermore, a layer of particles is substantially formed and the amount of the liquid retained by the spaces among the particles or powder is increased.

(Production of Polycarbodiimide)

The polycarbodiimide to be caused to be present as a film, a powder, or particles in or on an electrode or the separator or in other parts in a can in the invention is represented by formula (I) described above. In formula (I), examples of the organic group R include aromatic or aliphatic organic groups.

(i) Examples of the aromatic organic groups include substituents represented by

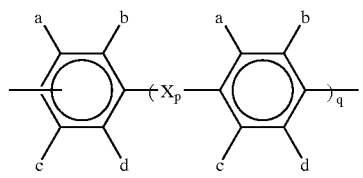

(wherein p is an integer of 0 to 10 and q means an integer of 0 to 5).

In the formula given above, X is

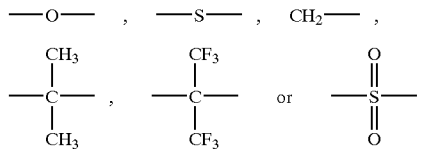

and the X's in the repeating units may be the same or different; and a, b, c, and d are —H, —CH$_3$, —OCH$_3$, —CF$_3$ or —OCF$_3$ and may be the same or different.

(ii) Examples of the aliphatic organic groups include substituents represented by
(wherein r means an integer of 0 to 10).

In the formula given above, Y is

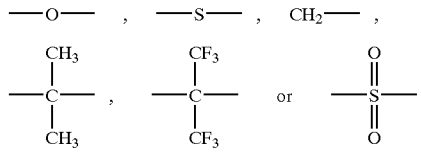

and the Y's in the repeating units may be the same or different; and a, b, c and d are —H, —CH$_3$, —OCH$_3$, —CF$_3$ or —OCF$_3$ and may be the same or different.

In formula (I), n is 1 to 10,000. If n exceeds 10,000, the polycarbodiimide undesirably has a reduced gelation time at room temperature, resulting in impaired workability.

For obtaining such a polycarbodiimide, a known method can be used. For example, the polycarbodiimide can be easily obtained by reacting an organic diisocyanate in an organic solvent in the presence of a carbodiimide synthesis catalyst in the manner described in T. W. Campbell et al., *J. Org. Chem.*, 28, 2069(1963), L. M. Alberino et al., *J. Appl. Polym. Sci.*, 21, 1999(1977), Unexamined Published Japanese Patent Applications Nos. 2-292316 and 4-275359, etc.

As the organic diisocyanate for use in the polycarbodiimide synthesis can be used, for example, 2,4-tolylene diisocyanate, 2,6-tolylene diisocyanate, 1-methoxyphenyl 2,4-diisocyanate, 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl ether diisocyanate, 3,3'-dimethyl-4,4'-diphenyl ether diisocyanate, hexamethylene diisocyanate, xylylene diisocyanate, 2,2-bis[4-(4-isocyanatophenoxy)phenyl] hexafluoropropane, 2,2-bis[4-(4-isocyanatophenoxy) methyl]propane, 2,2-dimethyl-1,3-bis(4-isocyanatophenoxy)propane, or the like. These may be used alone or may be used in combination of two or more thereof (to obtain a copolymer). For the purpose of imparting hydrophobicity, an organic diisocyanate substituted with one or more fluorine groups may be partly used.

As the organic solvent can be used, for example, toluene, xylene, a halogenated hydrocarbon such as tetrachloroethylene, 1,2-dichloroethane, or chloroform, a ketone such as acetone, methyl ethyl ketone, methyl isobutyl ketone, or cyclohexanone, a cyclic ether such as tetrahydrofuran or dioxane, or the like. These may be used alone or in combination of two or more thereof.

Furthermore, as the carbodiimide synthesis catalyst can be used, for example, a phospholene oxide such as 3-methyl-1-phenylphospholene 1-oxide, 1-phenyl-2-phospholene 1-oxide, 1-ethyl-2-phospholene 1-oxide, 1-ethyl-2-phospholene 1-oxide, or the 3-phospholene isomer of any of these. These may be used alone or in combination of two or more thereof.

In any of the final, middle, and initial stages of the polymerization reaction or throughout the reaction, a chain-terminating treatment may be conducted by adding a monoisocyanate. As such a monoisocyanate can be used phenyl isocyanate, p-nitrophenyl isocyanate, p- and m-tolyl isocyanates, p-formylphenyl isocyanate, p-isopropylphenyl isocyanate, or the like. The polycarbodiimide solution thus obtained has excellent storage stability.

The polycarbodiimide solution obtained is cast on a glass plate, dried, and peeled off, whereby a film can be obtained. On the other hand, particles or a powder can be obtained by vacuum-drying the solution described above and optionally pulverizing the resultant particles.

With respect to the function of inhibiting self-discharge, this function is presumed to be attributable to the ammonia gas trapping function of carbodiimide groups (W. Weith, Ber., 7, 10(1874)), because the fact that carbodiimide groups disappear when a film formed from carbodiimide is brought into contact with ammonia gas can be ascertained from an infrared absorption spectrum.

EXAMPLES

The invention will be explained below in more detail by means of Examples and Comparative Examples. Cells were evaluated in the following manner.

(Evaluation of Cell)

The cells obtained in the Examples and the Comparative Examples were first examined for discharge capacity. Subsequently, the cells were fully charged and then stored for 1 week at 45° C. to cause self-discharge. Thereafter, the cells were examined for discharge capacity, fully recharged, and then examined for discharge capacity. The results are shown in Table 1. The discharge rate was regulated to 0.2 $C_5A$, and the capacity retention was determined using the following equation.

Capacity retention [%]=(discharge capacity after self-discharge [$Ah$]/((discharge capacity before self-discharge[$Ah$]+discharge capacity after full recharge after self-discharge[$Ah$])/2)×100

Example I-1

To 500 g of toluene was added 100 g of Takenate 80 (manufactured by Takeda Chemical Industries, Ltd.; a 2,4-tolylene diisocyanate/2,6-tolylene diisocyanate mixture) together with 0.06 g of a carbodiimide synthesis catalyst (3-methyl-1-phenylphospholene 1-oxide) and 10 g of isopropylphenyl isocyanate. This mixture was reacted at 100° C. for 6 hours to obtain a polycarbodiimide solution (solution A). The molecular weight thereof was measured by GPC (gel permeation chromatography) to determine n, which was thus found to be 25. This solution was cast on a glass plate, subsequently dried at 90° C. for 30 minutes, and peeled off to obtain a film (thickness, 100 $\mu$m).

A nonwoven fabric composed of polypropylene and polyethylene fibers (basis weight, 60 g/M$^2$) was immersed in a 2.5 wt % aqueous solution of sodium dodecylbenzenesulfonate and dried. This fabric was used as a separator.

On the other hand, 100 parts by weight of a nickel hydroxide powder was mixed with 10 parts by weight of a cobalt powder, 10 parts by weight of a polytetrafluoroethylene (PTFE) powder, and 20 parts by weight of water to prepare a dispersion for positive-electrode formation. This liquid was forced into a foamed nickel (Ni) plate. The resultant nickel plate was dried and then pressed into a sheet to obtain a positive electrode. Furthermore, 100 parts by weight of a hydrogen-occluding alloy (mischmetal type) was mixed with 10 parts by weight of a PTFE powder and 20 parts by weight of water to prepare a dispersion for negative-electrode formation, which was forced into a foamed nickel plate. This plate was dried and then pressed into a sheet to obtain a negative electrode.

In fabricating a button type nickel-hydrogen cell (2032 size: diameter, 20 mm; height, 3.2 mm), the separator described above was immersed beforehand in a 7.2 kmol/m$^3$ electrolytic solution of potassium hydroxide to conduct vacuum impregnation. The polycarbodiimide film described above was subjected to punching to obtain a film piece of 12 mmΦ (12.9 mg), which was placed in a can. A nickel wire gauze for current collection and a nickel collector were placed thereon, and the negative electrode, the separator, the positive electrode, and an outer cover were superposed thereon.

Example I-2

The polycarbodiimide solution (solution A) obtained in Example I-1 was vacuum-dried and the resultant solid was pulverized to obtain a powder. A button type cell similar to that in Example I-1 was produced in the same manner as in Example I-1, except that 10 mg of the powder was used in place of the polycarbodiimide film.

Examples I-3 and I-4

A polycarbodiimide solution (solution B) was obtained (n determined by GPC was 408) and cells were produced in the same manner as in Example I-1 and Example I-2, respectively, except that 4,4'-diphenylmethane diisocyanate was used in place of Takenate 80.

Examples I-5 and I-6

A polycarbodiimide solution (solution C) was obtained (n determined by GPC was 18) and cells were produced in the same manner as in Example I-1 and Example I-2, respectively, except that 2,2'-dimethyl-1,3-bis(4-isocyanatophenoxy)-phenyl]propane was used in place of Takenate 80.

Examples I-7 and I-8

A polycarbodiimide solution (solution D) was obtained (n determined by GPC was 30) and cells were produced in the same manner as in Example I-1 and Example I-2, respectively, except that 2,2'-bis[4-(4-isocyanatophenoxy)phenyl]-hexafluoropropane was used in place of Takenate 80.

Comparative Example I-1

A cell was produced in the same manner as in Example I-1, except that the polycarbodiimide was not used.

(Application to Separator (1))

Example II-1

A polycarbodiimide solution (solution A) was obtained in the same manner as in Example I-1 (n determined by GPC was 25). The solution was cooled to room temperature and then vacuum-dried. The polymer dried was pulverized with a mortar. The resulting particles were sieved with a sieve having an opening size of 31 μm. Ten parts by weight of the polycarbodiimide powder which had passed the sieve was mixed with 10 parts by weight of the solution A described above and parts by weight of toluene to prepare a dispersion.

A nonwoven fabric composed of polypropylene and polyethylene fibers (basis weight, 60 g/m²) was immersed as a separator in the dispersion described above and dried at 80° C. for 30 minutes to obtain a separator. The separator was immersed beforehand in a 7.2 kmol/m³ electrolytic solution of potassium hydroxide to conduct vacuum impregnation and thereby incorporate the electrolytic solution into the pores. A button type nickel-hydrogen cell of the 2032 size was produced. The positive electrode, negative electrode, nickel wire gauze, nickel plate, and the can cover used were the same as in Example I-1.

Example II-2

Two kilograms of a UHPE powder (weight average molecular weight, 4,500,000; melting point, 135° C.; average particle diameter, 106 μm (sieved product)) was packed into a shape-retaining tool comprising a mold formed by placing a cylindrical metal gauze cage having an outer diameter of 4 cm in the center of a cylindrical metal gauze cage (inner diameter, 15 cm) and applying a porous polytetrafluoroethylene film to the inside of the resultant doughnut space. This mold was placed in a heat-resistant pressure vessel made of metal (equipped with a water vapor introduction pipe and a switch valve therefor), and the ambient pressure was adjusted to 1.3 kPa with a vacuum pump. Subsequently, the pump was stopped, and the pressure vessel was allowed to stand in this state for 30 minutes. Thereafter, the valve was opened to introduce water vapor and the ambient temperature was elevated to 120° C. over 10 minutes. This state was maintained for 30 minutes. Thereafter, the water vapor pressure was increased to 0.4 MPa and the temperature was regulated to 145° C. By maintaining this state, the UHPE powder was heated and sintered for 3 hours. Subsequently, the valve was closed to allow the sinter to cool naturally. Thus, a cylindrical UHPE porous material was obtained. The porous material obtained was sliced into a thickness of 200 μm with a cutting lathe to obtain a porous sheet having a porosity of 38%.

A button type cell was produced in the same manner as in Example II-1, except that this separator was used and that the dispersion was one prepared by mixing 10 parts by weight of the polycarbodiimide powder with 10 parts by weight of toluene.

Examples II-3 and II-4

A polycarbodiimide solution (solution B) was obtained (n determined by GPC was 408) and cells were produced in the same manner as in Example II-1 and Example II-2, respectively, except that 4,4'-diphenylmethane diisocyanate was used in place of Takenate 80.

Examples II-5 and II-6

A polycarbodiimide solution (solution C) was obtained (n determined by GPC was 18) and cells were produced in the same manner as in Example II-1 and Example II-2, respectively, except that 2,2'-dimethyl-1,3-bis(4-isocyanatophenoxy)-phenyl]propane was used in place of Takenate 80.

Examples II-7 and II-8

A polycarbodiimide solution (solution D) was obtained (n determined by GPC was 30) and cells were produced in the same manner as in Example II-1 and Example II-2, respectively, except that 2,2'-bis[4-(4-isocyanatophenoxy)phenyl]-hexafluoropropane was used in place of Takenate 80.

Comparative Example II-1

A cell was produced in the same manner, except that the sheet substrate used in Example II-2 was not coated with polycarbodiimide.

(Application to Separator (2))

Example III-1

A polycarbodiimide solution (solution A) was obtained (n determined by GPC was 25) in the same manner as in Example I-1, and cooled to room temperature. A nonwoven fabric composed of polypropylene and polyethylene fibers (basis weight, 60 g/m²) was immersed in that solution, taken out therefrom, and then dried at 90° C. for 30 minutes to obtain a battery separator. The amount of the polymer deposited on this separator was 22 g/m². The separator was immersed beforehand in a 7.2 kmol/m³ electrolytic solution of potassium hydroxide to conduct vacuum impregnation and thereby incorporate the electrolytic solution into the pores. Using this separator, a button type nickel-hydrogen cell of the 2032 size (diameter, 20 mm; height, 3.2 mm) was produced. The positive electrode, negative electrode, nickel wire gauze, nickel plate, and can cover used were the same as in Example I-1.

Example III-2

A polycarbodiimide solution (solution B) was obtained (n determined by GPC was 408) and a cell was produced in the same manner as in Example III-1, except that 4,4'-diphenylmethane diisocyanate was used in place of Takenate 80.

Example III-3

A polycarbodiimide solution (solution C) was obtained (n determined by GPC was 18) and a cell was produced in the same manner as in Example III-1, except that 2,2'-dimethyl-1,3-bis(4-isocyanatophenoxy)phenyl]propane was used in place of Takenate 80.

Example III-4

A polycarbodiimide solution (solution D) was obtained (n determined by GPC was 30) and a cell was produced in the same manner as in Example III-1, except that 2,2'-bis[4-(4-isocyanatophenoxy)phenyl]hexafluoropropane was used in place of Takenate 80.

(Application to Separator (3))

Example IV-1

A porous sheet (thickness, 200 µm; porosity, 38%) was obtained from a UHPE powder in the same manner as in Example II-2. A polycarbodiimide solution (solution A) was further obtained in the same manner as in Example I-1. The value of n thereof was determined by GPC, and was found to be 25. After this solution was cooled to room temperature, the porous sheet described above was immersed therein. Subsequently, the porous sheet was taken out and dried at 90° C. for 30 minutes to evaporate and remove the toluene. Thus, a battery separator (the amount of the polymer deposited thereon was 21 g/m$^2$) was obtained. This separator was immersed beforehand in a 7.2 kmol/m$^3$ electrolytic solution of potassium hydroxide to conduct vacuum impregnation, and a button type nickel-hydrogen cell of the 2032 size like the cells described above was produced. The positive electrode, negative electrode, nickel wire gauze, nickel plate, and can cover used were the same as in Example I-1.

Example IV-2

A polycarbodiimide solution was obtained in the same manner as in Example IV-1, except that xylylene diisocyanate was used in place of Takenate 80. The value of n of the polycarbodiimide obtained was 300. Using this solution, a separator was prepared. A cell was produced in the same manner as in Example IV-1.

Example IV-3

A polycarbodiimide solution (solution B) was obtained (n determined by GPC was 408) and a cell was produced in the same manner as in Example IV-1, except that 4,4'-diphenylmethane diisocyanate was used in place of Takenate 80.

Example IV-4

A polycarbodiimide solution (solution C) was obtained (n determined by GPC was 18) and a cell was produced in the same manner as in Example IV-1, except that 2,2'-dimethyl-1,3-bis(4-isocyanatophenoxy)phenyl]propane was used in place of Takenate 80.

Example IV-5

A polycarbodiimide solution (solution D) was obtained (n determined by GPC was 30) and a cell was produced in the same manner as in Example IV-1, except that 2,2'-bis[4-(4-isocyanatophenoxy)phenyl]hexafluoropropane was used in place of Takenate 80.

(Separator Comprising Porous Polycarbodiimide Sheet (1))

Example V-1

A polycarbodiimide solution (solution A) was obtained (n determined by GPC was 25) in the same manner as in Example I-1. After this solution was cooled to room temperature, it was cast on a glass, dried at 90° C. for 30 minutes, and then peeled off to obtain a film having a thickness of 100 µm. This film was perforated to form, per 1 cm$^2$, 40,000 through-holes having a diameter of 30 µmΦ. Thus, a separator having a porosity of 28% and a thickness of 100 µm was obtained. This separator was immersed in a 7.2 kmol/m$^3$ electrolytic solution of potassium hydroxide to conduct vacuum impregnation. Using this separator, a button type nickel-hydrogen cell of the 2032 size was produced. The positive electrode, negative electrode, nickel wire gauze, nickel plate, and can cover used were the same as in Example I-1.

Example V-2

A copper wire having a diameter of 18 µm was coated with the polycarbodiimide solution obtained in Example V-1 to obtain a coated copper wire having a diameter of 52 µm. Subsequently, the coated copper wire was tightly wound repeatedly on a core having a diameter of 60 cm until the diameter reached 70 cm, and the whole resultant structure including the core was heated at 160° C. for 2 hours to obtain a fusion-bonded united tubular structure. This structure was cooled and then sliced in a thickness of 80 µm in a direction perpendicular to the copper wire to obtain a sheet. This sheet was immersed in 1 mol/L hydrochloric acid to remove the copper wire and thereby obtain a separator having holes with a diameter of 18 µmΦ (porosity, 28%; thickness, 80 µm). Using this separator, a cell was produced in the same manner as in Example V-1.

Example V-3

A polycarbodiimide solution (solution B) was obtained (n determined by GPC was 408) and a cell was produced in the same manner as in Example V-1, except that 4,4'-diphenylmethane diisocyanate was used in place of Takenate 80.

Example V-4

A polycarbodiimide solution (solution C) was obtained (n determined by GPC was 18) and a cell was produced in the same manner as in Example V-1, except that 2,2'-dimethyl-1,3-bis(4-isocyanatophenoxy)phenyl]propane was used in place of Takenate 80.

Example V-5

A polycarbodiimide solution (solution D) was obtained (n determined by GPC was 30) and a cell was produced in the same manner as in Example V-1, except that 2,2'-bis[4-(4-isocyanatophenoxy)phenyl]hexafluoropropane was used in place of Takenate 80.

(Separator Comprising Porous Polycarbodiimide Sheet (2))

Example VI-1

A polycarbodiimide solution (solution A) was obtained (n determined by GPC was 25) in the same manner as in Example I-1. This solution was cooled to room temperature and then vacuum-dried. The polymer dried was pulverized with a mortar. The crude powder obtained was treated with a 60-mesh sieve to remove coarse particles therefrom. The polycarbodiimide particles were packed into a sheet-form shape-retaining tool, and the particles packed were sintered in a hot-air drying oven at 145° C. for 2 hours. The shape-retaining tool was taken out from the oven and cooled.

Thus, a porous sinter sheet (thickness, 300 μm; porosity, 30%) was obtained. This porous sinter sheet was immersed beforehand in a 7.2 kmol/m³ electrolytic solution of potassium hydroxide to conduct vacuum impregnation and thereby incorporate the electrolytic solution into the pores. A button type nickel-hydrogen cell of the 2032 size was produced. The positive electrode, negative electrode, nickel wire gauze, nickel plate, and the can cover used were the same as in Example I-1.

Example VI-2

1.8 kg of a UHPE powder (weight-average molecular weight, 4,500,000; melting point, 135° C.; average particle diameter, 106 μm (sieved product)) and 1.2 kg of the carbodiimide powder produced in Example VI-1 were packed into a shape-retaining tool comprising a mold formed by placing a cylindrical metal gauze cage having an outer diameter of 4 cm in the center of a cylindrical metal gauze cage (inner diameter, 15 cm) and applying a porous PTFE film to the inside of the resulting doughnut space.

This mold was placed in a heat-resistant pressure vessel made of metal (equipped with a water vapor introduction pipe and a switch valve therefor), and the ambient pressure was adjusted to 1.3 kPa with a vacuum pump. Subsequently, the pump was stopped, and the pressure vessel was allowed to stand in this state for 30 minutes. Thereafter, the valve was opened to introduce water vapor and the ambient temperature was elevated to 120° C. over 10 minutes. This state was maintained for 30 minutes. Thereafter, the water vapor pressure was increased to 0.4 MPa and the temperature was regulated to 145° C. By maintaining this state, the powders were heated and sintered for 3 hours. Subsequently, the valve was closed to allow the sinter to cool naturally. Thus, a cylindrical porous material was obtained. The porous material obtained was sliced into a thickness of 200 μm with a cutting lathe to obtain a sheet-form separator having a porosity of 50%.

A button type cell was produced in the same manner as in Example VI-1, except that this separator was used.

Comparative Example VI-1

A porous sheet having a thickness of 200 μm and a porosity of 43% was obtained in the same manner as in Example VI-2, except that the polycarbodiimide powder was not used and the UHPE powder used in Example VI-2 was used alone. The porous film obtained was immersed beforehand in an electrolytic solution to conduct vacuum impregnation and thereby incorporate the electrolytic solution into the pores. A button type nickel-hydrogen cell of the 2032 size (positive-electrode active material, nickel (Ni) hydroxide; negative-material active material, hydrogen-occluding alloy; electrolytic solution, aqueous potassium hydroxide solution) was fabricated.

(Separator Comprising Polycarbodiimide-coated Particles)

Production Example VII-1

Polycarbodiimide Sintering/UHPE Powder

A polycarbodiimide solution (solution A) was obtained (n determined by GPC was 25) in the same manner as in Example I-1. The value of n of the resultant polycarbodiimide as determined in tetrahydrofuran by GPC was 31.

The solution obtained was stirred together with 1.8 kg of a UHPE powder (weight-average molecular weight, 4,500, 000; melting point, 135° C.; average particle diameter, 106 μm (sieved product)) with a mixer for 30 minutes. Thereafter, the mixture was dried in a hot-air drying oven (100° C.) for 3 hours. The particle aggregates obtained were pulverized with a small pulverizer to obtain polycarbodiimide-coated polymer particles.

Subsequently, the particles were packed into a mold having a gap, compressed at 25° C. and a pressure of 20 MPa, and then sintered at 145° C. for 2 hours in a hot-air drying oven. After the sintering, the mold was taken out from the oven and cooled. Thus, a sintered porous sheet (thickness, 300 μm; porosity, 25%) was obtained.

Production Example VII-2

A shape-retaining tool was prepared which comprised a mold formed by placing a cylindrical metal gauze cage having an outer diameter of 4 cm in the center of a cylindrical metal gauze cage (inner diameter, 15 cm) and applying a porous PTFE film to the inside of the resultant doughnut space. The polycarbodiimide-coated polymer particles used in Production Example VII-1 were packed into this shape-retaining tool. This mold was placed in a heat-resistant pressure vessel made of metal (equipped with a water vapor introduction pipe and a switch valve therefor), and the ambient pressure was adjusted to 1.3 kPa with a vacuum pump. Subsequently, the pump was stopped, and the pressure vessel was allowed to stand in this state for 30 minutes. Thereafter, the valve was opened to introduce water vapor and the ambient temperature was elevated to 120° C. over 10 minutes. This state was maintained for 30 minutes. Thereafter, the water vapor pressure was increased to 0.4 MPa and the temperature was regulated to 145° C. By maintaining this state, the coated polymer particles were heated and sintered for 3 hours. Subsequently, the valve was closed to allow the sinter to cool naturally. Thus, a cylindrical porous material was obtained. The porous material obtained was sliced into a thickness of 200 μm with a cutting lathe to obtain a porous sheet having a porosity of 50%.

Comparative Production Example VII-1

A porous sheet (thickness, 200 μm; porosity, 43%) was obtained in the same manner as in Production Example VII-2, except that a UHPE powder was used in place of the polycarbodiimide-coated polymer particles.

Production Example VII-3

A polycarbodiimide solution was obtained under the same conditions as in Production Example VII-1, except that 20 g of isopropylphenyl isocyanate was used. The value of n of the resultant polycarbodiimide determined by GPC was 15. The subsequent procedure was conducted in the same manner as in Production Example VII-2 to obtain a porous sheet having a thickness of 200 μm and a porosity of 52%.

Production Example VII-4

A polycarbodiimide solution was obtained under the same conditions as in Production Example VII-1, except that 0.5 g of isopropylphenyl isocyanate was used. The value of n of the resultant polycarbodiimide determined by GPC was 77. The subsequent procedure was conducted in the same manner as in Production Example VII-2 to obtain a porous sheet having a thickness of 200 μm and a porosity of 50%.

Production Example VII-5

Polycarbodiimide-coated polymer particles having carbodiimide groups on the surface thereof were obtained in the same manner as in Production Example VII-1, except that an aliphatic-polycarbodiimide solution (trade name, GX-V07; manufactured by Nisshinbo Industries, Inc.) was used. Thereafter, a porous sheet having a thickness of 200 μm and a porosity of 51% was obtained in the same manner as in Production Example VII-2-[

Example VII-1 to Example VII-5 and Comparative Example VII-1

The porous sheets obtained in the Production Examples and Comparative Production Example were used as separators to produce cells. First, the separators were immersed beforehand in an electrolytic solution to conduct vacuum impregnation and thereby incorporate the electrolytic solution into the pores. Six button type nickel-hydrogen cells of the 2032 size (positive-electrode active material, nickel hydroxide; negative-electrode active material, hydrogen-occluding alloy; electrolytic solution, aqueous potassium hydroxide solution) were fabricated.

(Application to Electrode (1))

Example VIII-1

A polycarbodiimide solution (solution A) was obtained (n determined by GPC was 25) in the same manner as in Example I-1. This solution was cooled to room temperature and then vacuum-dried. The polymer dried was pulverized with a mortar.

On the other hand, 100 parts by weight of a nickel hydroxide powder was mixed with 10 parts by weight of a cobalt powder, 6 parts by weight of the polycarbodiimide powder described above, 10 parts by weight of a PTFE powder, and 20 parts by weight of water. The resultant mixture was forced into a foamed nickel (Ni) plate. This plate was dried and then pressed into a sheet to obtain a positive electrode. Furthermore, 100 parts by weight of a hydrogen-occluding alloy (mischmetal) was mixed with 10 parts by weight of a PTFE powder and 20 parts by weight of water, and the resultant mixture was forced into a foamed nickel plate. This plate was dried and then pressed into a sheet to obtain a negative electrode.

A nonwoven fabric composed of polypropylene and polyethylene fibers (basis weight, 60 g/m$^2$) was immersed in a 2.5 wt % aqueous solution of sodium dodecylbenzenesulfonate and then dried. This fabric was used as a separator. The separator was immersed beforehand in a 7.2 kmol/m$^3$ electrolytic solution of potassium hydroxide to conduct vacuum impregnation and thereby incorporate the electrolytic solution into the pores. A button type nickel-hydrogen cell of the 2032 size was produced.

Example VIII-2

The polycarbodiimide powder described above was mixed with negative electrode in the same manner as in Example VIII-1, and this mixture was forced into a foamed nickel plate. This plate was dried and then pressed into a sheet to obtain a negative electrode. No polycarbodiimide powder was added to the positive electrode. A cell was fabricated in the same manner as in Example VIII-1 except these.

Example VIII-3

A cell was fabricated in the same manner as in Example VIII-1, except that the positive electrode of Example VIII-1 and the negative electrode of Example VIII-2 were used.

Example VIII-4

A polycarbodiimide solution (solution B) was obtained (n determined by GPC was 408) and a cell was produced in the same manner as in Example VIII-1, except that 4,4'-diphenylmethane diisocyanate was used in place of Takenate 80.

Example VIII-5

A polycarbodiimide solution (solution C) was obtained (n determined by GPC was 18) and a cell was produced in the same manner as in Example VIII-1, except that 2,2'-dimethyl-1,3-bis(4-isocyanatophenoxy)phenyl]propane was used in place of Takenate 80.

Example VIII-61

A polycarbodiimide solution (solution D) was obtained (n determined by GPC was 30) and a cell was produced in the same manner as in Example VIII-1, except that 2,2'-bis[4-(4-isocyanatophenoxy)phenyl]hexafluoropropane was used in place of Takenate 80.

Comparative Example VIII-1

A cell was produced in the same manner as in Example VIII-1, except that polycarbodiimide sprinkling was omitted.

(Application to Electrode (2))

Example IX-1

A polycarbodiimide solution (solution A) was obtained (n determined by GPC was 25) in the same manner as in Example I-1. This solution was cooled to room temperature and then vacuum-dried. The polymer dried was pulverized with a mortar. On the other hand, 100 parts by weight of a nickel hydroxide powder was mixed with 13 parts by weight of a cobalt powder, 10 parts by weight of a PTFE powder, and 20 parts by weight of water. The resultant mixture was forced into a foamed nickel (Ni) plate. This plate was dried and then pressed into a sheet to obtain a positive electrode. Furthermore, 100 parts by weight of a hydrogen-occluding alloy (mischmetal type) as a negative-electrode active material was mixed with 10 parts by weight of a PTFE powder and 20 parts by weight of water, and the resultant mixture was forced into a foamed nickel plate. This plate was dried. The polycarbodiimide described above was evenly scattered on the dried plate in such an amount that the proportion by weight thereof to the active material was 5/100. This powder-covered plate was pressed into a sheet to obtain a negative electrode. A nonwoven fabric composed of polypropylene and polyethylene fibers (basis weight, 60 μm$^2$) was immersed in a 2.5 wt % aqueous solution of sodium dodecylbenzenesulfonate and dried. This fabric was used as a separator. The separator was immersed beforehand in a 7.2 kmol/m$^3$ electrolytic solution of potassium hydroxide to conduct vacuum impregnation and thereby incorporate the electrolytic solution into the pores. A button type nickel-hydrogen cell of the 2032 size was produced.

Example IX-2

A cell was fabricated in the same manner as in Example IX-1, except that the polycarbodiimide compound was evenly scattered on the positive electrode in such an amount that the proportion by weight thereof to the active material was 5/100 and this place was pressed into a sheet to obtain a positive electrode, and that no polycarbodiimide was added to the negative electrode.

Example IX-3

A cell was fabricated in the same manner as in Example IX-1, except that the negative electrode of Example IX-1 and the positive electrode of Example IX-2 were used.

Example IX-4

A polycarbodiimide solution (solution B) was obtained (n determined by GPC was 408) and a cell was produced in the same manner as in Example IX-1, except that 4,4'-diphenylmethane diisocyanate was used in place of Takenate 80.

Example IX-5

A polycarbodiimide solution (solution C) was obtained (n determined by GPC was 18) and a cell was produced in the same manner as in Example IX-1, except that 2,2'-dimethyl-1,3-bis(4-isocyanatophenoxy)phenyl]propane was used in place of Takenate 80.

Example IX-6

A polycarbodiimide solution (solution D) was obtained (n determined by GPC was 30) and a cell was produced in the same manner as in Example IX-1, except that 2,2'-bis[4-(4-isocyanatophenoxy)phenyl]hexafluoropropane was used in place of Takenate 80.

Comparative Example IX-1

A cell was produced in the same manner as in Example IX-1, except that the polycarbodiimide was not used.

(Application to Between Separator and Electrode)

Example X-1

A polycarbodiimide solution (solution A) was obtained (n determined by GPC was 25) in the same manner as in Example I-1. This solution was cooled to room temperature and then vacuum-dried. The polymer dried was pulverized with a mortar. A nonwoven fabric composed of polypropylene and polyethylene fibers (basis weight, 60 g/m$^2$) was immersed in a 2.5 wt % aqueous solution of sodium dodecylbenzenesulfonate and then dried. This fabric was used as a separator.

The separator was immersed beforehand in a 7.2 kmol/m$^3$ electrolytic solution of potassium hydroxide to conduct vacuum impregnation and thereby incorporate the electrolytic solution into the pores. A button type nickel-hydrogen cell of the 2032 size was produced. During the production, 5 mg of the polycarbodiimide powder described above was sprinkled between the separator and the negative electrode. The positive electrode, negative electrode, nickel wire gauze, nickel plate, and the can cover were the same as in Example I-1.

Example X-2

A button type cell was produced in the same manner as in Example X-1, except that the sheet-form porous UHPE used in Example II-2 was used as a separator.

Example X-3

A cell was fabricated in the same manner as in Example X-1, except that the polycarbodiimide powder described above was sprinkled between the separator and the positive electrode in an amount of 5 mg and was not sprinkled between the separator and the negative electrode.

Example X-4

A cell was fabricated in the same manner as in Example X-1, except that the polycarbodiimide powder described above was sprinkled between the separator and the positive electrode and between the separator and the negative electrode each in an amount of 2.5 mg.

Examples X-5 and X-6

A polycarbodiimide solution (solution B) was obtained (n determined by GPC was 408) and cells were produced in the same manner as in Examples X-1 and X-2, respectively, except that 4,4'-diphenylmethane diisocyanate was used in place of Takenate 80.

Examples X-7 and X-8

A polycarbodiimide solution (solution C) was obtained (n determined by GPC was 18) and cells were produced in the same manner as in Examples X-1 and X-2, respectively, except that 2,2'-dimethyl-1,3-bis[4-isocyanatophenoxy) phenyl]-propane was used in place of Takenate 80.

Example X-9 and X-10

A polycarbodiimide solution (solution D) was obtained (n determined by GPC was 30) and cells were produced in the same manner as in Examples X-1 and X-2, respectively, except that 2,2'-bis(4-(4-isocyanatophenoxy)phenyl] hexafluoropropane was used in place of Takenate 80.

Comparative Example X-1

A cell was produced in the same manner as in Example X-2, except that the sprinkling of the polycarbodiimide powder between the separator and the negative electrode was omitted.

TABLE 1

| | | I Polycarbodiimide form | | II Separator | | III Separator | IV | V Separator Poly- | VI Separator Sintered | VII Separator | VIII Polycarbodiimide, | IX Polycarbodiimide, | X Between separator/electrode | |
|---|---|---|---|---|---|---|---|---|---|---|---|---|---|---|
| | Polycarbodiimide | Film | Powder | Nonwoven fabric | UHPE | Nonwoven fabric | Separator UHPE | Carbodiimide | polycarbodiimide | Coated particles | within electrode | on electrode surface | Nonwoven fabric | UHPE |
| Example | A | (I-1) 69 | (I-2) 66 | (II-1) 83 | (II-2) 82 | 82 | 82 | 80 | 85 | 82 | 76 | 80 | (X-1) 82 | (X-2) 82 |
| | | | | | | | | | | | 75 | 80 | (X-3) 81 | |
| | | | | | | | 78 | 80 | 80 | | 76 | 81 | (X-4) 82 | |

TABLE 1-continued

| Poly-carbo-di-imide | I Polycarbodiimide form | | II Separator | | III Separator Non-woven fabric | IV Separator UHPE | V Separator Poly-Carbo-di-imide | VI Separator Sintered poly-carbo-diimide | VII Separator Coated particles | VIII Polycarbo-diimide, within electrode | IX Polycarbo-diimide, on electrode surface | X Between separator/electrode | |
|---|---|---|---|---|---|---|---|---|---|---|---|---|---|
| | Film | Powder | Non-woven fabric | UHPE | | | | | | | | Non-woven fabric | UHPE |
| B | (I-3) 70 | (I-4) 68 | (II-3) 83 | (II-4) 83 | 83 | 83 | 82 | — | — | 78 | 81 | (X-5) 82 | (X-6) 83 |
| C | (I-5) 67 | (I-6) 66 | (II-5) 79 | (II-6) 80 | 81 | 80 | 77 | — | — | 75 | 78 | (X-7) 80 | (X-8) 79 |
| D | (I-7) 68 | (I-8) 67 | (II-7) 76 | (II-8) 75 | 73 | 75 | 75 | — | 78 84 82 72 | 73 | 73 | (X-9) 72 | (X-10) 73 |
| Comparative Example | 56 | | — | 56 | | | | 44 | 44 | 56 | 56 | — | 56 |

INDUSTRIAL APPLICABILITY

A high self-discharge inhibitory effect is obtained and battery life is improved by using polycarbodiimide in any of various forms such as sheet, powder, and coating film within a battery can, e.g. as a separator material or electrode material, or adding it to the separator or an electrode, or causing it to be present between the separator and an electrode, etc.

What is claimed is:

1. A battery comprising a positive electrode, a negative electrode and a separator interposed between the two electrodes, wherein the separator contains a polymer having in the molecule thereof a recurring carbodiimide unit represented by the following formula (I):

$$-[-R-N=C=N-]_n-\quad\quad (I)$$

(wherein R is an aliphatic or aromatic organic group and n is an integer of 1 to 10,000), wherein the battery is an alkaline secondary battery, and the separator comprises polyolefin.

2. The battery of claim 1, wherein the polymer is in the form of a sheet, particles, or a powder.

3. The battery of claim 1, wherein the polymer is disposed in pores of the separator.

4. The battery of claim 1, wherein the separator is a porous sheet formed by sintering a powder of ultrahigh-molecular weight polyethylene having a weight average molecular weight of 1.000,000 or higher.

5. The battery of claim 1, wherein the polymer covers at least part of the surface of the separator.

6. The battery of claim 1, wherein at least part of the surface of the separator is a nonwoven fabric sheet comprising polyolefin fibers coated with the polymer.

7. The battery of claim 1, wherein the separator is a porous sheet comprising the polymer.

8. The battery of claim 1, wherein the polymer which is particulate or powdery is disposed between the separator and an electrode.

9. The battery of claim 1, wherein the separator is a porous sinter sheet obtained by sintering the polymer and polyolefin particles at a temperature not lower than the melting point of the polyolefin particles.

10. The battery of claim 1, wherein the separator is a porous sheet obtained by slicing a porous sinter.

11. The battery of claim 1, wherein the separator is a porous sheet comprising coated polymer particles obtained by forming a coating layer of polycarbodiimide on the surface of core particles.

12. The battery of claim 11, wherein the core particles are a polyolefin resin.

13. The battery of claim 1, wherein at least one of the positive electrode and negative electrode of the battery has the polymer on the surface and/or in an inner part thereof.

* * * * *